Figure 1:
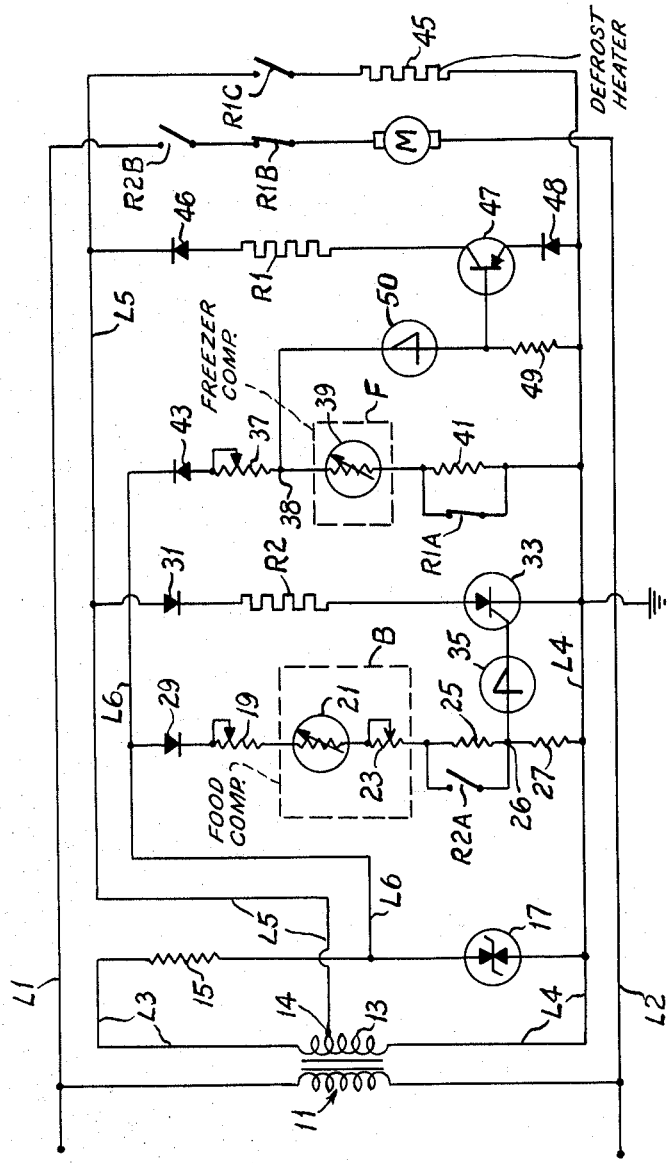

May 3, 1966 W. T. SUTTON ETAL 3,248,892
REFRIGERATION CONTROL REGULATING TEMPERATURE AND FROST BUILD-UP
Filed Feb. 25, 1963 2 Sheets-Sheet 1

Walter T. Sutton
James D. Broyles
Nelson F. Botts,
   Inventors.
Koenig, Pope, Senniger and Powers,
   Attorneys.

United States Patent Office 3,248,892
Patented May 3, 1966

3,248,892
REFRIGERATION CONTROL REGULATING TEMPERATURE AND FROST BUILD-UP
Walter T. Sutton, James D. Broyles, and Nelson F. Botts, Lexington, Ky., assignors to Texas Instruments Incorporated, Dallas, Tex., a corporation of Delaware
Filed Feb. 25, 1963, Ser. No. 260,417
24 Claims. (Cl. 62—156)

This invention relates to refrigeration control, and more particularly to methods and apparatus for regulating temperature and frost build-up in refrigeration apparatus.

Among the several objects of this invention may be noted the provision of an electronic system for precisely controlling the temperature within a refrigerated zone; the provision of such a system which employs temperature sensors having reduced thermal mass whereby the response time of the system is appreciably reduced; the provision of a control for automatically defrosting a refrigeration unit when the frost build-up therein reaches a predetermined level; the provision of such a control wherein the actual frost build-up rather than estimated frost build-up is employed as a criterion in determining the necessity of a defrost cycle; the provision of a control of the class described wherein electrical insulating problems are minimized; the provision of a control for a refrigerator having a food compartment and a freezer compartment wherein the temperature and frost controls are interlocked; the provision of a method for controlling the operation of refrigeration apparatus to regulate both temperature and frost build-up; and the provision of a control for refrigeration apparatus which is relatively inexpensive, rugged, and reliable in operation. Other objects and features will be in part apparent and in part pointed out hereinafter.

Briefly, this invention relates to a control for a refrigeration system having cooling means, for example, an evaporator coil, which absorbs heat from a refrigerated zone, and wherein a portion at least of the cooling means is subject to frost build-up. This control comprises a thermistor positioned contiguous the cooling means, and means associated with the cooling means adapted when energized to defrost this cooling means. The control further comprises an electrical circuit interconnected with the thermistor and responsive to the resistance thereof for actuating this defrost means when the temperature of the thermistor drops below a preselected level so that as the frost on the cooling means builds up to envelop the thermistor the temperature thereof is depressed below this preselected level and the defrost means is actuated. In a preferred embodiment of the present invention, the defrost means includes an electric heater and the electrical circuit includes an electronic transducer, for example a transistor or silicon controlled rectifier, and a thermal relay which in combination function to actuate or energize this heater when the frost on the cooling means builds up to envelop the thermistor.

In its more specific aspects, the invention is directed to the combination of the frost control portion above-described and a temperature regulating portion which includes a second thermistor and means responsive thereto for maintaining the temperature within the refrigerated zone below a preselected temperature level.

The invention accordingly comprises the constructions, circuits and methods hereinafter described, the scope of the invention being indicated in the following claims.

Figure 2:
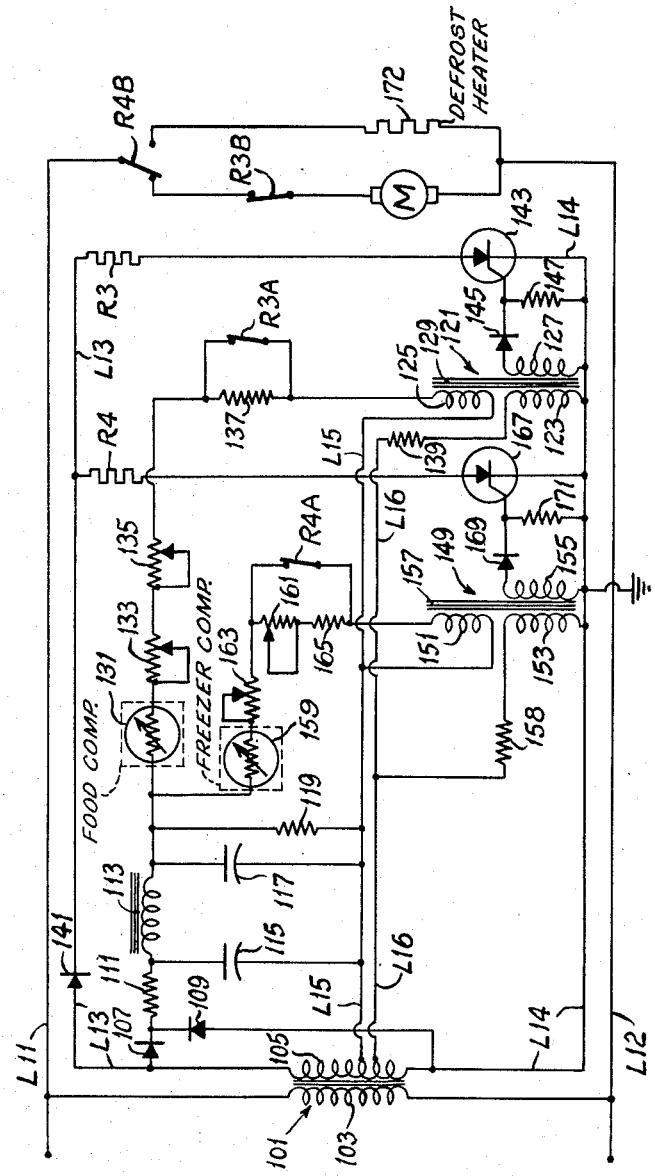

In the accompanying drawings, FIGS. 1 and 2 are circuit diagrams illustrating the electrical components of two preferred embodiments of the present invention and their interconnection.

Corresponding reference characters indicate corresponding parts throughout the drawings.

Referring now to FIG. 1, a first embodiment of the invention is illustrated as including a step-down transformer 11 having a primary winding connected between two conductors L1 and L2 which supply power from a 117 v. A.C. power source. Transformer 11 has a tapped secondary winding 13 connected between two conductors L3 and L4. A tap 14 on winding 13 is connected to a conductor L5. The potential between conductors L4 and L5 is preferably approximately 20 v. A.C., while that between lines L3 and L4 is preferably on the order of 50 v. A.C. Connected between lines L3 and L4 is a series circuit which includes a resistor 15 and a voltage-regulating Zener diode 17. The junction between these latter two elements is connected to a conductor L6.

A voltage-dividing network consisting of a first variable resistance 19, a temperature-sensitive resistor, for example, a thermistor 21, a second variable resistance 23 and a pair of series-connected resistances 25 and 27 is connected between the cathode of a rectifying diode 29 and line L4. The anode of diode 29 is connected to line L6. This diode serves to convert the A.C. voltage appearing across lines L4 and L6 to a pulsating D.C. or half-wave rectified voltage. The junction between resistances 25 and 27, indicated at 26, constitutes one output terminal of the voltage dividing network, while line L4 constitutes a second output terminal thereof. Line L4 is preferably connected to ground as indicated to constitute a common ground for the control or low-voltage portion of the FIG. 1 circuit.

Thermistor 21 is preferably a semiconductor device having a high negative temperature coefficient of resistivity; i.e., as its temperature is increased, its resistance decreases appreciably. This thermistor is located in the refrigerated zone to sense or respond to the tempearture therein. It will be assumed hereinafter that this zone is the food compartment of a refrigerator, indicated by a box B. It will also be assumed that the refrigeration system is of the conventional type which includes an evaporator, a condenser, and a compressor unit. Variable resistor 23 constitutes a control resistor the setting of which determines or controls the temperature which is to be maintained within compartment B. The movable contact or slider of this resistance is connected to a properly calibrated operating knob or control (not shown). Variable resistance 19 constitutes a trimmer resistor which is provided for calibration purposes to compensate for any variations which might occur in the parameters of thermistor 21, or any of the other components in this voltage-dividing network.

The FIG. 1 circuit further includes a thermal relay which comprises a heating element R2 and two sets of thermally-responsive, normally-open contacts R2A and R2B positioned in thermal communication or heat exchange relationship with element R2. Contacts R2A are connected in shunt across resistor 25, while contacts R2B are connected in series with a motor M which drives the compressor of the refrigerator. Heating element R2 is connected in series with a rectifying diode 31 and the cathode-anode circuit of a silcon controlled rectifier (SCR) 33 between conductors L4 and L5. An avalanche diode 35 interconnects terminal 26 of the voltage divider network with the gate or control electrode of SCR 33. The voltage-dividing network which includes thermistor 21, the series circuit which includes heating element R2, and the avalanche diode 35 constitute a temperature control portion of the FIG. 1 circuit which functions to control the energization of motor M to maintain the temperature within the food compartment of the refrigerator below a preselected or predetermined level.

The FIG. 1 control also includes means for providing automatic defrosting of the cooling means or evaporator tube of the refrigerator being controlled. Normally, this cooling means will be located in the freezer compartment of the refrigerator, indicated by a box F. This portion of the FIG. 1 circuit includes a voltage-dividing network which comprises a variable resistance 37, a thermistor 39, and a fixed resistance 41 serially connected between the anode of a rectifying diode 43 and line L4. The cathode of diode 43 is connected to line L6. Thermistor 39 is positioned within the freezer compartment F of the refrigerator under control, contiguous or immediately adjacent the evaporator tube therewithin. Preferably, thermistor 39 is mechanically attached or bonded to this evaporator tube. The junction between resistor 37 and thermistor 39, indicated at 38, constitutes one output terminal of the voltage-dividing network, while line L4 constitutes the other output terminal thereof.

The automatic defrost control portion of the FIG. 1 circuit also includes a thermal relay consisting of a heating element R1 and contacts R1A, R1B, and R1C. Contacts R1A are connected in shunt with resistance 41; contacts R1B, in series with compressor motor M; and contacts R1C, in series with a defrost heater 45. Contacts R1A and R1B are normally closed, while contacts R1C are normally open. Defrost heater 45 is, for example, positioned contiguous or immediately adjacent the cooling means in the freezer compartment.

Heating element R1 is connected in series with a rectifying diode 46 and the collector-emitter circuit of a power transistor 47 across lines L4 and L5. A biasing diode 48 is provided between the emitter of transistor 47 and line L4; while a biasing resistor 49 is connected between the base of this transistor and conductor L4. Interconnected between the terminal 38 and the base or control electrode of transistor 47 is an avalanche diode 50.

Operation of the FIG. 1 circuit is as follows: the box-temperature control portion will be considered first. The temperature which is to be maintained in the food compartment of the refrigerator is selected by the adjustment or setting of variable resistance 23. As the temperature within the box goes above this preselected temperature, the concurrent decrease of the resistance of thermistor 21 causes the voltage developed across resistance 27 to increase to a point at which avalanche diode 35 breaks down. This initiates current flow in the gate-cathode circuit of SCR 33 which conditions this SCR to conduct and thereby pass the pulsating D.C. from rectifying diode 31. The resulting current through heater R2 increases the temperature thereof and (after a predetermined delay determined by the parameters of thermally-responsive contacts R2A and R2B), causes these contacts to close. The closing of contacts R2B connects compressor motor M across lines L1 and L2, energizing this motor, and thereby initiating a cooling cycle. The closing of contacts R2A in effect removes resistance 25 from the voltage-dividing network which includes thermistor 21, thereby providing a desirable temperature differential in the system by insuring that after SCR 33 has been triggered, the box temperature must be lowered to a temperature somewhat below that selected by control resistance 23 before SCR 33 is cut off. If contacts R2A and resistance 25 were not provided, the temperature differential of the system would be a function of the parameters of the various components of the system, for example, the conduction and cut-off points of avalanche diode 35. The provision of contacts R2A and resistance 25 provides a means for accurately controlling the temperature differential of the control.

Motor M remains energized and the cooling cycle continues until the temperature within the food compartment is lowered to a point at which the voltage at terminal 26 is no longer sufficient to cause SCR 33 to be triggered. When this occurs, the pulsating D.C. through heater R2 is cut off. This causes heater R2 to cool and thereby permit contacts R2B and R2A to return to their normally-open condition. The opening of contacts R2A and R2B deenergizes compressor motor M and reinserts resistance 25 into the voltage-dividing network. Motor M remains deenergized until the temperature of the box again rises above that preselected by control resistance 23, at which time diode 35 again breaks down, causing SCR 33 to be placed in its conductive mode. This reenergizes heater R2, thereby initiating another cooling cycle. The size of resistance 25 is chosen so that in any particular system, the number of cooling cycles (i.e., the number of times motor M is energized per hour) under certain standard conditions is controlled so as to be at least a predetermined number per hour.

The operation of the frost control portion of the FIG. 1 system which includes the voltage-dividing network including thermistor 39, the series circuit including transistor 47, and avalanche diode 50, is as follows: The method employed in controlling the frost build-up within the freezer compartment may be characterized as a depressed-temperature method. Thermistor 39 is positioned immediately adjacent the cooling means within the freezer compartment so that as the frost builds up on this cooling means to envelop thermistor 39, the temperature of this variable resistance device is decreased. This increases the resistance of thermistor 39, thereby increasing the voltage drop across this device. Because of the polarity of diode 43, the voltage at point 38 is negative with respect to conductor L4. When the potential of point 38 with respect to line L4 becomes sufficiently negative to trigger avalanche diode 50, current flows from line L4 through biasing resistor 49, avalanche diode 50, resistance 37, and through rectifying diode 43 to line L6. The current through resistance 49 biases the base of resistor 47 negative with respect to its emitter. This causes this transistor to conduct thereby allowing pulsating D.C. to flow through heater R1. This in turn causes the actuation of thermally-responsive switches R1A, R1B and R1C; contacts R1A and R1B open and contacts R1C close. The opening of contacts R1B prevents energization of compressor motor M during a defrost cycle; the closing of contacts R1C energizes defrost heater 45 by connecting it across lines L4 and L5; and the opening of contacts R1A in effect inserts resistance 41 in series with thermistor 39 between conductor L4 and point 38. This added resistance insures that the temperature of thermistor 39 is increased to a point above that at which it initiated a defrost cycle in order for the defrost cycle to be terminated. The function of contacts R1A and resistance 41 is analogous to that of contacts R2A and resistance 25; i.e., contacts R1A and resistance 41 provide the desired temperature differential in the defrost control portion of the system. The adjustment or setting of variable resistance 37 determines or controls the temperature of thermistor 39 at which avalanche diode 50 breaks down, and accordingly, determines the point at which a defrost cycle is initiated.

The energization of heater 45 defrosts the cooling means within the freezer compartment and concurrently raises the temperature of thermistor 39. This decreases the resistance of this thermistor and thereby decreases the negative potential at terminal 38 to a point at which avalanche diode 50 no longer conducts. This, in turn, removes the negative bias from the base of transistor 47, preventing current flow through the collector-emitter circuit of this transistor and thereby causing relay heating element R1 to be deenergized. As heater R1 cools down, switches or contacts R1A, R1B, and R1C are actuated to their normal positions. This in effect removes resistance 41 from the voltage-dividing network; permits motor M to be energized by operation of contacts R2B; and deenergizes defrost heater 45, respectively. The defrost portion of the system is thus reset to sense actual frost build-up in the freezer compartment and initiate a subsequent defrost cycle when this build-up exceeds a predetermined amount.

Various modifications of the FIG. 1 circuit will be apparent to those skilled in the art. For example, in the box temperature control portion of the circuit, avalanche diode 35 could be eliminated since silicon controlled rectifier 33 itself exhibits avalanche type operating characteristics. It is preferred, however, that diode be included since it provides a more specific turn on point than is possible with the SCR alone. This avoids the possibility of any creep action of the switching control point. Also, since SCR 33 functions as a rectifier, diode 29 is not, strictly speaking, a necessary component of the temperature control portion. Again it is preferred that this diode be included since it permits the use of an SCR having an appreciably reduced PIV (peak inverse voltage) rating. Further, if an avalanche diode is provided, it would be possible to substitute a power transistor, such as transistor 47, for the SCR 33 to control the energization of relay heater R2. In the frost control portion of the FIG. 1 circuit, a silicon controlled rectifier, either alone or in combination with an avalanche diode, could be employed in place of power transistor 47 and diode 50. Moreover, while compressor motor M is illustrated as being a 117 volt motor, it will be understood that a low-voltage motor could be employed to drive the compressor of the refrigeration unit. In this event, motor M would be connected across lines L4 and L5 instead of lines L1 and L2. Conversely, heater 45, which is illustrated as being a low-voltage heater, could be a high-voltage heater, in which case it would be energized by lines L1 and L2. It is preferred, however, that heater 45 be a low-voltage heater since this greatly reduces the problems of providing approved electrical insulation.

Because a thermistor 21 having a low thermal mass is employed in the box temperature sensing portion of the FIG. 1 circuit, the thermal inertia of the system is considerably reduced. This increases the response time of the system, greatly enhancing the overall control. Another feature of the FIG. 1 system is that a defrost cycle is initiated only when the frost in the freezer compartment or on the cooling means builds up above a predetermined level; and the actual frost buildup rather than estimated frost build-up is employed as a criterion in determining the necessity of the defrost cycle. The FIG. 1 circuit therefore possesses substantial advantages over systems wherein a timer is provided to periodically defrost the freezer according to a predetermined program. In one typical installation wherein the control of FIG. 1 was employed to control the operation of a domestic refrigerator, a defrost cycle occurred on an average of once every twelve days. This is to be contrasted with typical timer-controlled systems wherein there are one or two defrost cycles each day. Moreover, because the present system actually senses the frost within the freezer compartment, both to initiate a defrost cycle and terminate it, the durations of the defrost cycles are likely to be considerably less than in timer-operated systems. Because variable resistances 23 and 37 are employed to select the temperature to be maintained within the food compartment and to control the point at which a defrost cycle is initiated, respectively, these two control functions may be interlocked by ganging or otherwise mechanically interconnecting the movable contacts or sliders of these two resistances. Such an arrangement would not be possible in prior art temperature-frost control systems. Also, because both the compressor and the defrost heater are controlled by mechanically actuated contacts (R1B, R1C and R2B), this system is likely to be more acceptable to various approval agencies such as Underwriters Laboratories which might be reluctant under the present standards to approve a system employing electronic or semiconductor load-switching devices. However as the art develops, the present system has the advantage of being readily convertible to an all-electronic control. Moreover, the present system lends itself to the use of new and improved temperature-sensing devices as they become available.

A second embodiment of this invention is illustrated in FIG. 2. This embodiment includes a step-down transformer 101 having a primary winding 103 connected across a pair of conductors L11 and L12 which supply power from a 117 v. A.C. power source. The secondary winding of transformer 101, indicated at 105, is connected across a pair of conductors L13 and L14, the latter being connected to ground as indicated. Winding 105 has two taps or terminals thereon connected respectively to conductors L15 and L16. The potential of line L13 with respect to line L14 is preferably on the order of 20 volts; the potential of line L15 with respect to line L14 is preferably 10 volts; and the potential between line L16 and L14 is preferably approximately 7 volts. Connected across lines L13 and L14 is a full-wave rectifier which includes a pair of diodes 107 and 109 connected respectively to opposite ends of winding 105. Connected at the output of this rectifier is a current-limiting resistor 111 and a low-pass filter or smoothing network which includes an inductor 113 and a pair of capacitors 115 and 117. A load or bleeder resistor 119 is provided, connected across the output of this filter circuit.

The FIG. 2 circuit includes generally a box or food-compartment temperature control portion and an automatic-defrost control portion. The former includes a magnetic amplifier 121 having a primary winding 123, a bias or control winding 125, an output or secondary winding 127, and a saturable magnetic core 129. The box-temperature control portion also includes a temperature-sensing thermistor 131 located within the food compartment. This thermistor is connected in series with a variable control resistance 133 also located in the food compartment, with a trimmer resistor 135, and with a fixed resistor 137. Variable resistance 133 constitutes a control, the setting of which determines or controls the temperature which is to be maintained within the food compartment. The movable contact or slider of this resistance is connected to an operating knob or similar element (not shown) properly calibrated in terms of box temperature. Variable resistance 135 is provided to compensate for variations which might occur in the operating parameters of thermistor 131 and any other components in the voltage-dividing network. Bias winding 125 is connected between resistance 137 and line L15, while the primary or input winding of magnetic amplifier 121 is connected in series with a resistance 139 across lines L14, L16.

A series circuit which includes a rectifying diode 141, the heater element R3 of a thermal relay, and the cathode-anode circuit of an SCR 143 is connected between lines L13 and L14. The gate-cathode circuit of SCR 143 is connected in a series loop circuit which includes a steering diode 145, and the output winding 127 of magnetic amplifier 121. A biasing resistor 147 is connected in shunt across the gate-cathode of SCR 143. The thermal relay which includes heating element R3 also includes a pair of thermally-responsive switches or contacts R3A and R3B positioned in heat exchange relationship with element R3. Contacts R3A are normally-closed contacts connected in parallel with resistor 137, while contacts R3B are normally-closed contacts connected in series with the motor M which drives the compressor of the refrigerator.

The automatic frost control portion of the FIG. 2 circuit includes a magnetic amplifier 149 which is similar in construction to amplifier 121. Amplifier 149 includes a control or bias winding 151, an input or primary winding 153, an output or secondary winding 155 and a saturable magnetic core 157. Input winding 153 is connected in series with a resistor 158 across lines L14 and L16. The frost control portion also includes a thermistor 159 located within the freezer compartment of the refrigerator being controlled, immediately adjacent (and preferably bonded or attached to) the cooling means therein. Connected in series with thermistor 159 are two variable resistances 161 and 163. Resistance 163 is provided to control or establish the point at which a defrost cycle is initiated, while variable resistance 161 provides a means for controlling the temperature point at which this cycle is terminated. Connected in series with thermistor 159 and resistances 161 and 163 is a fixed resistance 165.

Also included is a silicon controlled rectifier (SCR) 167, the anode-cathode circuit of which is connected in series with a heater R4 of a second thermal relay between the cathode of diode 141 and line L14. The gate-cathode circuit or SCR 167 is connected in a loop circuit which includes a steering diode 169 and the output winding 155 of magnetic amplifier 149. A biasing resistor 171 is connected across the gate-cathode of SCR 167. The thermal relay which includes heating element R4 also includes a pair of thermally-responsive switches or contacts R4A and R4B. The former are normally-closed contacts connected in parallel with resistances 161 and 165, while the latter constitute a single-pole, double-throw switch which in a first position permits the energization of compressor motor M and in a second position energizes a defrost heater 172. Normally, contacts R4B permit energization of motor M. Heater 172, which is preferably located within the freezer compartment of the refrigerator, immediately adjacent the cooling means therein, functions when energized to remove frost within this compartment.

Operation of the FIG. 2 embodiment is as follows: Again the box-temperature control portion of the circuit will be considered first. The temperature which is to be maintained within the food compartment of the refrigerator is selected by the adjustment or setting of variable resistance 133. When the temperature within the box at the locaion of thermistor 131 is below this temperature, the resistance thereof is high enough so that the flux density in core 129 (due to the resultant current flow througth bias winding 125) is of a level which permits the coupling or inducing of an A.C. voltage in winding 127 of an amplitude sufficient to cause diode 145 to repetitively pulse or trigger the gate electrode of SCR 143. This causes conduction of SCR 143 and in turn causes current to flow through heater resistor R3 from diode 141. The pulsating D.C. through R3 heats this element, maintaining contacts R3A and R3B open. As the temperature within the food compartment rises, the resistance of thermistor 131 decreases. When the temperature within the box goes above the level preselected by variable resistance 133, the current through thermistor 131, resistances 133, 135 and 137, and through control or bias winding 125 causes the flux density in core 129 to be increased to a point wherein the A.C. voltage applied across winding 123 no longer induces a voltage in output winding 127 of sufficient amplitude to trigger SCR 143. This causes this device to be non-conducting and prevents current flow through heater element R3. As this element cools down, contacts R3A and R3B return to their normally-closed position. This does two things: First, the closing of contacts R3B connects compressor motor M across lines L11 and L12, energizing the compressor of the refrigeration unit. Secondly, the closing of contacts R3A in effect shunts out or removes resistance 137 from the circuit. This latter action insures a proper temperature differential for the box-temperature control portion of the circuit as described above in connection with FIG. 1.

As the temperature within the food compartment is lowered due to the energization of motor M, the resistance of thermistor 131 increases. This in turn decreases the current through bias winding 125 to a point wherein the A.C. signal coupled to output winding 127 and rectified by diode 145 is sufficient to trigger SCR 143 into conduction, again causing current to flow through heater resistor R3. As this element heats up, thermally-responsive contacts R3A and R3B are actuated to their respective open positions. This deenergizes compressor motor M and reinserts resistance 137 into the control circuit. The control is thus reset to sense the temperature within the food compartment and initiate a subsequent cooling cycle when the temperature therein rises above that preselected by the setting of resistor 133.

The automatic defrost portion of the FIG. 2 system operates as follows: When there is no appreciable frost build-up within the freezer unit, the temperature of thermistor 159, which is attached to the evaporator coils within the freezer compartment, is sufficiently high (and the resistance thereof sufficiently low) that the current through control winding 151 of magnetic amplifier 149 causes a substantial increase in the D.C. flux density in core 157. Under these conditions, the A.C. voltage coupled to output winding 155 and rectified by diode 169 is of insufficient amplitude to cause conduction of SCR 167. As a result resistance heater R4 is deenergized. As the frost builds up on the evaporator unit to envelop thermistor 159, its temperature is depressed, and its resistance increased. This decreases the current through bias winding 151 to a point at which the A.C. signal coupled from winding 153 to the output winding 155 (and half-wave rectified by diode 169) is of sufficient amplitude to cause SCR 167 to conduct and permit pulsating D.C. current from rectifier 141 to flow through heater element R4. As heater R4 heats up, contacts R4A and R4B are actuated: contacts R4A to their open position, and contacts R4B to the right (as viewed in FIG. 2). This latter action prevents energization of compressor motor M and energizes defront heater 172. The opening of contacts R4A in effect inserts resistances 161 and 165 in series with thermistor 159, thereby insuring a sufficient temperature differential for the system.

The energization of heater 172 defrosts the cooling means within the freezer compartment and concurrently raises the temperature of thermistor 159. This causes the resistance of this element to decrease and the current through control winding 151 to increase to a point wherein the A.C. voltage induced in winding 155 is no longer sufficient to cause SCR 167 to conduct. As a result heater element R4 is deenergized. As this heater resistor cools down, contacts R4A and R4B are actuated to the positions illustrated in FIG. 2. This deenergizes the defrost heater 172; permits energization of compressor motor M; and in effect removes resistance 165 from the series circuit which includes control or bias winding 151. Thereafter, as the frost again builds up to envelop thermistor 159, its temperature decreases; its resistance increases; and the current through winding 151 is again decreased to a point wherein SCR 167 is again triggered to permit current flow through heating element R4. At this point, a subsequent defrost cycle is initiated as outlined above.

The FIG. 2 embodiment possesses the substantial advantages mentioned above in connection with FIG. 1. Because thermistors 131 and 159 have low thermal mass, the thermal inertia of the control is considerably reduced. This increases the response time of the system, greatly enhancing the overall control. As is the case with the FIG. 1 control, a defrost cycle is initiated only when the frost in the freezer compartment actually builds up above a predetermined level. Because variable resistances are employed (1) to select the temperature to be maintained within the food compartment and (2) to control the point at which a defrost cycle is initiated, these two functions may be interlocked by ganging the movable contacts of these resistances. Also, the FIG. 2 system provides a control which is effective over a wide range of voltages, say from 90 to 130 volts, and which is substantially immune to transients. Because the system employs thermal relays, all external circuit components such as the defrost heater and the compressor motor are provided with positive mechanical switching. And because the control portion of the circuit employs low voltage throughout, the problems encountered in switching or controlling high voltages are eliminated. Moreover, intercable connections inside the apparatus being controlled are considerably less complicated and therefore less expensive than in systems employing high-voltage control circuits. It will be understood that either one or both of heater 172 and compressor motor M of the FIG. 2 system could be low-voltage devices, in which case switching arrangements analogous to those illustrated in FIG. 1 could be employed.

Although the present invention is disclosed as providing temperature and frost control in a domestic refrigerator, it will be understood that this invention could be employed in any refrigeration system wherein temperature and/or frost control are required, for example, in air conditioning units or other similar applications. Also, while the various controlled rectifiers employed in the systems of FIG. 1 and FIG. 2 are disclosed as silicon controlled rectifiers, these transducers could be made of semiconductor material other than silicon, as long as they exhibit proper operating characteristics.

In view of the above, it will be seen that the several objects of the invention are achieved and other advantageous results attained.

As various changes could be made in the above constructions, circuits, and methods without departing from the scope of the invention, it is intended that all matter contained in the above description and shown in the accompanying drawings be interpreted as illustrative and not in a limiting sense.

What is claimed is:

1. Refrigeration control apparatus for controlling refrigeration cooling means adapted to absorb heat from a refrigerated zone, said cooling means being subject to frost build-up, said cooling means having means associated therewith adapted when energized to defrost said cooling means; said control apparatus comprising a thermistor positionable contiguous to said cooling means, said thermistor having an electrical resistance which varies as a function of the temperature thereof, an electrical resistance network including said thermistor, and an electrical circuit including an electronic transducer and means for controlling the conductivity of said transducer as a function of the resistance of said thermistor, said transducer being interconnectable with said defrost means for energizing said defrost means when the temperature of said thermistor is depressed below a first preselected temperature level, said network including means for modifying the resistance thereof substantially concurrently with the energization of the defrost means and while the defrost means is energized thereby to provide a substantial differential in the operation of said circuit, whereby as the frost on said cooling means builds up and envelops said thermistor the temperature thereof is depressed below said first preselected level and said defrost means is energized, and whereby said defrost means is thereafter deenergized only after the temperature of said thermistor rises above a second preselected temperature substantially higher than said first preselected temperature.

2. Refrigeration control apparatus as set forth in claim 1 wherein said electronic transducer is a transistor having a control electrode, and wherein said means for controlling the conductivity of said transistor includes an avalanche diode interconnected between said thermistor and said control electrode.

3. Refrigeration control apparatus as set forth in claim 1 wherein said electronic transducer is a controlled rectifier having a gate electrode, and wherein said means for controlling the conductivity of said controlled rectifier includes a magnetic amplifier having a control winding interconnected with said thermistor and an output winding interconnected with said gate electrode.

4. Refrigation control apparatus as set forth in claim 1 wherein said electrical circuit includes a relay adapted to control the energization of said defrost means.

5. Refrigeration control apparatus as set forth in claim 4 wherein said relay is a thermal relay including a heating element and a set of thermally-responsive contacts in heat exchange relationship therewith, said contacts controlling the energization of said defrost means.

6. Refrigeration apparatus comprising cooling means adapted to absorb heat from a refrigerated zone, said cooling means being subject to frost build-up, means associated with said cooling means adapted when energized to defrost said cooling means, a thermistor positioned contiguous to said cooling means, said thermistor having an electrical resistance which varies as a function of the temperature thereof, a voltage source, a voltage dividing resistance network connected across said source, said network having first and second output terminals and including said thermistor whereby the potential of said first terminal with respect to said second terminal is a function of the resistance of said thermistor, and an electrical circuit including an electronic transducer and means interconnected with said first and second terminals for controlling the conductivity of said transducer as a function of said potential, said transducer being interconnected with said defrost means for energizing said defrost means when said potential reaches a preselected level corresponding to a first predetermined resistance of said thermistor whereby when the frost on said cooling means builds up to envelop said thermistor the resistance thereof reaches said first predetermined level and said defrost means is energized, said network including means for modifying the resistance thereof substantially concurrently with the energization of the defrost means and while the defrost means is energized thereby to provide a substantial differential in the operation of said circuit, whereby said defrost means is thereafter deenergized only after the resistance of said thermistor changes to a second predetermined value.

7. Refrigeration apparatus as set forth in claim 6 wherein said electrical circuit includes a thermal relay having a heating element and a set of thermally responsive contacts in heat exchange relationship therewith, said contacts adapted to control the energization of said defrost means, said electronic transducer being interconnected with said thermistor and responsive to the resistance thereof for controlling the energization of said heating element thereby to control the actuation of said contacts.

8. Refrigeration apparatus as set forth in claim 6 wherein said voltage dividing network includes a variable resistance for controlling the temperature of said thermistor at which said defrost means is energized.

9. Refrigeration apparatus as set forth in claim 7 wherein said thermal relay includes an additional set of thermally-responsive contacts, and wherein said voltage dividing network includes a resistance connected in parallel with said contacts, whereby the condition of said contacts determines whether said resistance is interconnected in said voltage dividing network, said resistance and said contacts controlling the temperature differential of said control and constituting said means for modifying the resistance of said network.

10. Refrigeration apparatus comprising cooling means adapted to absorb heat from a refrigerated zone, said cooling means being subject to frost build-up, means associated with said cooling means adapted when energized to defrost said cooling means, a thermistor positioned contiguous to said cooling means, said thermistor having an electrical resistance which varies as a function of the temperature thereof, a current source and resistance network interconnected with said thermistor for causing current flow therethrough, an electronic transducer for controlling the energization of said defrost means, an electrical circuit including said transducer connected to said thermistor for controlling the conductivity of said transducer as a function of the current through said thermistor, said network including means for modifying the resistance thereof substantially concurrently with the energization of the defrost means and while the defrost means is energized thereby to provide a substantial differential in the operation of said circuit, and means interconnected with said transducer for energizing said defrost means when said current reaches a preselected level corresponding to a first predetermined resistance of said thermistor whereby as the frost on said cooling means builds up and envelops said thermistor the current therethrough reaches said preselected level and said defrost means is energized, and whereby said defrost means is thereafter deenergized only after the resistance of said thermistor changes to a second predetermined value.

11. Refrigeration apparatus as set forth in claim 10 wherein said electrical circuit includes a magnetic amplifier having a control winding connected in series with said thermistor and an output winding interconnected with a control electrode of said transducer.

12. Refrigeration apparatus as set forth in claim 11 wherein said transducer is a controlled rectifier and wherein said control electrode is the gate electrode of said controlled rectifier, and wherein said means for energizing said defrost means includes a thermal relay having a heating element and a set of thermally responsive contacts in heat exchange relationship therewith, said heating element being controlled by the conductivity of said controlled rectifier whereby the actuation of said contacts is controlled by the conductivity of said controlled rectifier.

13. Refrigeration apparatus as set forth in claim 11 further including a variable resistance connected in series with said thermistor for controlling the current therethrough whereby the temperature of said thermistor at which said defrost means is energized is controlled by the resistance of said variable resistance.

14. Refrigeration apparatus as set forth in claim 12 wherein said means for modifying the resistance of said network comprises a resistor connected in said network and a second pair of contacts of said thermal relay.

15. A refrigerator comprising a food compartment, a freezer compartment, and cooling means in heat exchange relationship with said compartments adapted when energized to absorb heat therefrom, at least a portion of said cooling means being positioned within said freezer compartment and being subject to frost build-up, defrost means associated with said cooling means adapted when energized to defrost said cooling means, a first thermistor located within said food compartment to sense the temperature therein, said first thermistor having an electrical resistance which varies as a function of the temperature within said food compartment, a first electrical resistance network including said first thermistor, a first relay adapted to energize said cooling means, a first electrical circuit connected to said first network and responsive to the resistance of said first thermistor for causing said first relay to energize said cooling means when the temperature of said first thermistor rises above a first predetermined temperature level, a second thermistor positioned contiguous said cooling means, said second thermistor having a resistance which varies as a function of the temperature thereof, a second electrical resistance network including said second thermistor, a second relay adapted to prevent actuation of said cooling means and energize the defrost means, and a second electrical circuit connected to said second network and responsive to the resistance of said second thermistor for causing said second relay to prevent actuation of said cooling means and energize the defrost means when the temperature of said second thermistor is depressed below a first preselected level whereby as the frost builds up on said cooling means and envelops said second thermistor the temperature thereof is depressed below said first preselected level, said second electrical network including means for modifying the resistance thereof when the defrost means is energized thereby to provide a substantial differential in the operation of said second electrical circuit whereby said defrost means is thereafter deenergized only after the temperature of said second thermistor rises above a second preselected temperature level substantially higher than said first preselected temperature level.

16. A refrigerator as set forth in claim 15 wherein said first electrical circuit includes a first electronic transducer for controlling said first relay, and means interconnected with said first thermistor for controlling the conductivity of said first transducer as a function of the resistance of said first thermistor whereby said first relay causes said cooling means to be energized when the resistance of said first thermistor goes below a predetermined level; and wherein said second electrical circuit includes a second electronic transducer adapted to control said second relay, and means interconnected with said second thermistor for controlling the conductivity of said second transducer as a function of the resistance of said second thermistor whereby said second relay prevents energization of said cooling means and energizes said defrost means when the resistance of said second thermistor rises above a preselected level.

17. A refrigerator as set forth in claim 16 wherein said first network includes a first variable resistance interconnected with said first thermistor for controlling the temperature within said food compartment, and said second network includes a second variable resistance interconnected with said second thermistor for controlling the maximum amount of frost build-up on said cooling means, and means for controlling the respective resistances of said first and second variable resistances.

18. A refrigerator as set forth in claim 17 in which said first and second variable resistances are mechanically interlocked.

19. A refrigerator as set forth in claim 16 wherein each of said relays is a thermal relay including a respective heating element and thermally responsive contacts, and wherein each respective heating element is interconnected with a respective transducer whereby the energization of each said heating element is controlled by the conductivity of its respective transducer.

20. A refrigerator as set forth in claim 19 wherein at least one of said transducers is a controlled rectifier having a gate electrode, and which further includes an avalanche diode connected to the gate electrode controlling the conductivity of said controlled rectifier.

21. A refrigerator as set forth in claim 19 wherein each of said transducers is a controlled rectifier having a gate electrode, and in which said first and second electrical circuits each include a magnetic amplifier for controlling the conductivity of its respective controlled rectifier, each magnetic amplifier having a control winding interconnected with a respective one of said thermistors and an output winding connected to the gate electrode of a respective one of said rectifiers.

22. A refrigerator as set forth in claim 15 in which both of said resistance networks are parallel connected across a common electrical power source.

23. A refrigerator as set forth in claim 15 in which said first electrical network includes means for modifying the resistance thereof when said first relay is energized thereby to provide a differential in the operation of said first electrical circuit whereby said cooling means is deenergized after the temperature of the first thermistor falls below a second predetermined temperature level lower than said first predetermined temperature level.

24. A refrigerator as set forth in claim 23 in which said means for modifying the resistance of said first network comprises a first resistor connected in the first network and having a set of electrical contacts of said first relay interconnected therewith, and in which said means for modifying the resistance of said second network comprises a second resistor connected in the second network and having a set of contacts of said second relay interconnected therewith.

References Cited by the Examiner
UNITED STATES PATENTS

| | | | |
|---|---|---|---|
| 2,545,353 | 3/1951 | Gund | 236—78 |
| 2,669,848 | 2/1954 | Fujii | 62—140 |
| 2,892,916 | 6/1959 | Holmes | 317—132 |
| 3,106,647 | 10/1963 | Danke | 307—88.5 |
| 3,119,951 | 1/1964 | Davy | 317—141 |
| 3,121,175 | 2/1964 | Vigneron | 307—88.5 |

OTHER REFERENCES

Publication: New Design Ideas From SSPI, by Solid State Products, Inc., Pingree St., Salem, Mass., received by office Nov. 21, 1961.

ROBERT A. O'LEARY, *Primary Examiner*.